United States Patent [19]

Kim et al.

[11] Patent Number: 5,952,250
[45] Date of Patent: Sep. 14, 1999

[54] UNCOATED FABRIC FOR PRODUCING AIRBAGS

[75] Inventors: Kwang Oh Kim; Sang Mok Lee; Sung Yup Moon, all of KyungSangBuk-Do, Rep. of Korea

[73] Assignee: Kolon Industries, Inc., Kyunggi-do, Rep. of Korea

[21] Appl. No.: 08/988,371

[22] Filed: Dec. 10, 1997

[30] Foreign Application Priority Data

Dec. 10, 1996 [KR] Rep. of Korea ........................ 96-63365
Sep. 23, 1997 [KR] Rep. of Korea ........................ 97-48218

[51] Int. Cl.$^6$ ....................................................... B32B 5/02
[52] U.S. Cl. .......................... 442/203; 442/185; 442/208; 442/212; 442/213; 442/215; 442/220; 280/728.1; 280/777

[58] Field of Search ................................... 280/728.1, 777; 442/203, 208, 212, 213, 215, 220, 185

[56] References Cited

U.S. PATENT DOCUMENTS 5,466,514 11/1995 Kataoka et al. ........................ 428/229
5,637,385 6/1997 Mizuki et al. ........................... 442/361
5,713,598 2/1998 Morita et al. ......................... 280/743.1

*Primary Examiner*—Marion McCamish
*Assistant Examiner*—Ula Ruddock
*Attorney, Agent, or Firm*—Oblon, Spivak, McClelland, Maier & Neustadt, P.C.

[57] ABSTRACT

An uncoated fabric for producing airbags, said fabric woven of synthetic monofilaments and having a monofilament denier in the weft which is less than that of the warp.

7 Claims, No Drawings

5,952,250

UNCOATED FABRIC FOR PRODUCING AIRBAGS

BACKGROUND OF THE INVENTION

1. Field of the Invention

The present invention relates to uncoated fabrics for producing airbags, which are used to protect vehicle occupants from unexpected peril during vehicular collision. More particularly, synthetic filament has been used for warp and weft in weaving, and the mono filament of weft has lower denier than that of warp.

2. Description of the Background

It is now normal practice to use an airbag system along with seat belts in transportation means especially in automobiles for the purpose of protecting passengers from vehicular collision and its accompanying shock. Since an airbag system is usually installed in door handles or in the dashboard of an automobile, the smaller the volume of an airbag, the better. Airbags should also have excellent heat-resistance and abrasion-resistance, since airbags sustain high heat and repeated concussions of the vehicle over a long time period.

In order to be effective in the event of a traffic accident, airbags need to exhibit some specific features such as compactness, strength, flexibility and lightness in weight in order to protect the heads and bodies of passengers. In the event of an accident, high temperature and high pressure gas from an inflator inflates the airbags in order to protect passengers from any perils. High temperature and high pressure gas generated from an inflator comes into contact with the fabric of the airbag and expands the airbag. If the airbag fabric is not sufficiently compact, high temperature and high pressure gas will leak out of airbag and then directly contact the human body, which may cause such harmful effects as suffocation.

Compactness of the fabric of an airbag is desirable, provided that the air permeability of the fabric is less than 0.5 cc/(cm$^2$•sec) measured under 1.27 cm H$_2$O pressure difference. The airbag should also have superior tensile strength because of its rapid expansion by the high temperature and high pressure gas. The tensile strength of the bags should be greater than 181 kg/inch, when it is measured by ASTM D5034 method. Furthermore, the airbag fabric needs to have good flexibility and should be light weight in order to increase the efficiency of installation of an airbag in a module. Lightness in weight of the airbags is also helpful in controlling vehicle weight. Desirably, the thickness of the airbag fabric is less than 0.04 cm and the weight of fabric is less than 250 g/m$^2$.

Known methods of attempting to produce fabrics which satisfy the above specific requirements of airbag fabrics are described as follows:

Japanese Published Patent No. 64-41438 discloses a method of producing airbag fabric using a synthetic filament whose monofilament denier of is less than 3 denier and whose total denier is 840 denier in both the warp and weft. The woven airbag fabric has a density in the warp and weft of 24 ends/inch. A rubber coating is applied to the airbag fabric surface. The airbag fabric is coated with such materials as chloroprene, neoprene and silicon rubber. These rubbers may improve the compactness of the fabric, and the efficiency of hot wind cut-off. Unfortunately, however, the process of production is very complicated and the cost of production increases because of the troublesome problem of recycling of airbag fabric.

Japanese Published Patent No. 6-306728 discloses a method of overcoming the problems which accompany the coating of a fabric. The reference employs a synthetic filament as warp and weft, which has more than 20 texturing knobs per a meter, with the denier of the mon filament ranging from 0.6–3.0 denier in the weaving of the airbag fabric. The synthetic filament employed is textured to prevent filling of the warp during weaving. Even though this method has some effect in simplifying the weaving process, because it eliminates the coating process and saves production costs, it has the problem of inefficiency in producing yarns having texturing knobs.

In order to solve the above problems, a low air permeability airbag fabric using a synthetic filament having a monofilament denier of 3.5~4.5 dtex is disclosed in Korean Published Patent No. 92-16632. Though the method disclosed therein makes it possible to increase the compactness of the airbag fabric, the method does not make it possible practically to weave a high density airbag fabric because of filling in the warp.

In order to eliminate the problem of filling in the warp when a synthetic filament is employed in weaving in both the warp and weft, the suggestion of sizing the filaments of the warp prior to weaving has been made. This method, however, may have the problems of increasing flammability and of deterioration, which deterioration results from the breeding infestation of bacteria on the fabric, particularly in the case of fabric from which sizing agent has not been removed by washing after it has been woven.

SUMMARY OF THE INVENTION

Accordingly one object of the present invention is to provide an uncoated fabric for the production of airbags, employed to prevent danger to the occupants of a vehicle upon collision, of improved low air permeability, good flexibility and lightness in weight.

Briefly, this object and other objects of the present invention as hereinafter will become more readily apparent can be attained by an uncoated fabric for producing airbags, which fabric is woven of synthetic monofilaments which are such that the monofilament denier in the weft is less than that of the warp. The monofilaments are not textured, nor sized.

DESCRIPTION OF THE PREFERRED EMBODIMENTS

The fabric of the present invention for producing airbags (hereinafter referred to as "uncoated airbag fabric" or "airbag fabric") is not coated with rubber or other material to prepare an airbag fabric of high density. This fact simplifies the process of preparing the airbag and reduces production costs. Additionally, particular features of the present uncoated airbag fabric are:

Higher denier monofilaments of the warp than those of the weft prevent filling in the warp, Lower denier monofilaments of the weft than those of the warp permit a weave of higher density, and No sizing material is applied to the fabric to achieve a high density weave of the fabric.

The result of the above factors is that it is possible to weave a high density airbag fabric with superior weaving efficiency while at the same time minimizing the occurrence of filling without the use of a sizing agent.

In the present invention filaments, which are not coated with a sizing agent, are woven in high density to form the airbag fabric. The filaments are selected such that the monofilaments of the warp have a denier of 6–12 and the denier of the monofilaments of the weft ranges from 1.5 denier to below 6.0 denier. In this case, the desirable total denier of the warp and weft ranges from 210 denier to 840 denier.

The preferred denier of the monofilaments of the warp used in the present invention for the uncoated airbag fabric ranges from 6 denier to 12 denier. If the denier of the monofilaments of the warp is less than the above denier range, it is difficult to weave in high density because of filling during weaving. On the other hand, if the denier of monofilaments of the warp is higher than the above denier range, the compactness of the airbag fabric is reduced. So it is necessary to lower the denier of the monofilaments of the weft in order to compensate for the loss of compactness. In the event the denier of the monofilaments of the weft is too low, breaking of the weft during weaving will be frequent, and the flexibility of the warp direction will be diminished. These problems consequently make it difficult to install an airbag within the airbag module or a fixed portion in a vehicle.

The denier of the monofilaments of the weft which are used to prepare the present uncoated airbag fabric ranges from 1.5 denier to less than 6.0 denier. In this case, if the denier of the monofilaments of the weft is less than the above range for the uncoated airbag fabric, then breaking of the weft will be frequent during weaving. On the other hand, if the denier of the monofilaments of the weft is greater than the above range for the present uncoated airbag fabric, then the compactness of the airbag fabric will deteriorate.

It is desirable that the difference between denier of the monofilaments of the warp and the denier of the monofilaments of the weft is more than 2.0 denier in order to improve compactness and weaving efficiency.

It is desirable that the total denier of the synthetic filaments used in the warp and weft directions in the preparation of the uncoated airbag fabric ranges from 210 denier to 840 denier. If the total denier of the airbag fabric is too low, while the airbag can be installed within a fixed portion of a vehicle, but the airbag fabric, nevertheless, has low tear and tensile strength. On the other hand, if the total denier of the airbag fabric is too high, the tear and tensile strength are satisfactory, but its not easy to install the airbag within a fixed portion of a vehicle.

Synthetic filaments which are used in the warp and weft of the present uncoated airbag fabric are manufactured from one or more than one resin which is selected from the group of thermoplastic resins of polyamide 66, polyamide 6, polyamide 46 and polyester.

The present uncoated airbag fabric can be woven in a plain weave, a basket weave or a twill weave. The air permeability of the fabric, measured under 1.27 cm $H_2O$ difference in pressure, should be less than 0.5 cc/(cm$^2$.sec).

The airbag fabric of present invention can not only be woven with cheaper production costs by simple processing because it is not coated with rubber or other materials, but it is possible to prevent the characteristic changes and combustibility of airbags which result from the presence of sizing agent on the synthetic filaments of the warp. By using a monofilament of greater denier in the warp and a smaller denier monofilament in the weft, it is possible to eliminate filling at in the warp, and to weave a high density airbag fabric in high efficiency of weaving.

Having generally described this invention, a further understanding can be obtained by reference to certain specific examples which are provided herein for purposes of illustration only and are not intended to be limiting unless otherwise specified.

EXAMPLE 1

As for the warp, non-sized polyamide 66 monofilaments having a denier of 6.2 and a total denier of 420 was adopted for weaving. And as for the weft, at the same time, non-sized monofilaments of polyamide 66 filament having a denier of 3.1 and a total denier of 420 was adopted for weaving. After being woven in a plain weave, the conventional process steps of scouring and heat setting were followed. An airbag fabric, having a density of 58 ends/inch in the warp and a density of 53 picks/inch in the weft, was produced. The efficiency of weaving in this case is 94% and the air permeability of airbag is 0.23 cc/(cm$^2$.sec).

EXAMPLE 2–3

Except for changes in the deniers of the monofilaments and the densities of the fabric in the warp and the weft as shown in Table 1, airbag fabrics were produced by the same method and process of Example 1. The efficiency of weaving and the air permeability of the airbag fabric are shown as Table 3.

EXAMPLE 4–5

Except for the changes in the kinds of polymer, deniers of monofilaments, deniers of multi-filaments, densities of fabric in the warp and the weft, airbag fabrics are woven as shown in Table 2 using the weaving methods described therein. Airbag fabrics are produced by the same method and process described in Example 1. The efficiency of weaving and air permeability of airbag fabric are shown as Table 3.

COMPARATIVE EXAMPLE 1–5

Except for the changes in the deniers of monofilaments and densities of fabric in the warp and the weft as described in Table 1, airbag fabrics are produced by the same method and process of Example 1. The efficiency of weaving and air permeability of the airbag fabric are shown as Table 3.

COMPARATIVE EXAMPLE 6–9

Except for the changes in the kinds of polymer, deniers of monofilaments, deniers of multi-filaments, and densities of fabric in the warp and the weft, airbag fabrics are woven by the methods described in Table 2. Airbag fabrics are prepared by the same method and process of Example 1. The efficiency of weaving and the air permeability of the airbag fabric are shown as Table 3.

TABLE 1

WEAVING CONDITIONS OF EXAMPLE 1 ~ 3, AND COMPARATIVE EXAPMLE 1 ~ 5

| | TYPE OF FILAMENT (DENIER/FILAMENT) | | DENIER OF MONO-FILAMENT (DENIER) | | DENSITY OF FABRIC | |
|---|---|---|---|---|---|---|
| | WARP | WEFT | WARP | WEFT | WARP (ends/inch) | WEFT (picks/inch) |
| EXAMPLE 1 | 420/68 | 420/136 | 6.2 | 3.1 | 58 | 53 |
| EXAMPLE 2 | 420/68 | 420/136 | 6.2 | 3.1 | 58 | 53 |
| EXAMPLE 3 | 420/68 | 420/136 | 6.2 | 3.1 | 49 | 49 |

TABLE 1-continued

WEAVING CONDITIONS OF EXAMPLE 1 ~ 3,
AND COMPARATIVE EXAPMLE 1 ~ 5

| | TYPE OF FILAMENT (DENIER/FILAMENT) | | DENIER OF MONO-FILAMENT (DENIER) | | DENSITY OF FABRIC | |
|---|---|---|---|---|---|---|
| | WARP | WEFT | WARP | WEFT | WARP (ends/inch) | WEFT (picks/inch) |
| COMPARATIVE EXAMPLE 1 | 420/136 | 420/136 | 3.1 | 3.1 | 58 | 53 |
| COMPARATIVE EXAMPLE 2 | 420/68 | 420/136 | 6.2 | 6.2 | 53 | 53 |
| COMPARATIVE EXAMPLE 3 | 420/136 | 420/136 | 3.1 | 3.1 | 53 | 53 |
| COMPARATIVE EXAMPLE 4 | 420/104 | 420/104 | 4.0 | 4.0 | 53 | 53 |
| COMPARATIVE EXAMPLE 5 | 420/68 | 420/68 | 6.2 | 6.2 | 49 | 49 |

TABLE 2

WEAVING CONDITIONS OF EXAMPLE 4 ~ 5,
AND COMPARATIVE EXAMPLE 6 ~ 9

| | KINDS OF POLYMER | | DENIER OF MONO FILAMENT (DENIER) | | DENIER OF MULTI FILAMENT (DENIER) | | DENSITY (Ends/inch) | | METHOD OF WEAVING |
|---|---|---|---|---|---|---|---|---|---|
| | WARP | WEFT | WARP | WEFT | WARP | WEFT | WARP | WEFT | |
| EXAM. 4 | POLYAMIDE 6 | | 8 | 2 | 210 | 210 | 75 | 75 | BASKET |
| EXAM. 5 | POLY AMIDE | POLY ESTER 46 | 12 | 2 | 420 | 420 | 49 | 49 | TWILL |
| COM. EXAM. 6 | POLYAMIDE 66 | | 3.1 | 3.1 | 420 | 420 | 58 | 53 | PLAIN |
| COM. EXAM. 7 | POLYAMIDE 6 | | 6.2 | 6.2 | 420 | 420 | 53 | 53 | BASKET |
| COM. EXAM. 8 | POLYAMIDE 66 | | 4.0 | 4.0 | 420 | 420 | 53 | 53 | TWILL |
| COM. EXAM. 9 | POLYESTER | | 5.0 | 6.2 | 420 | 420 | 49 | 49 | PLAIN |

TABLE 3

WEAVING EFFICIENCY AND AIR PERMEABILITY

| | WEAVING EFFICIENCY (%) | AIR PERMEABILITY (cc/cm$^2$ · sec) |
|---|---|---|
| EXAMPLE 1 | 94 | 0.23 |
| EXAMPLE 2 | 97 | 0.30 |
| EXAMPLE 3 | 98 | 0.48 |
| EXAMPLE 4 | 97 | 0.30 |
| EXAMPLE 5 | 98 | 0.45 |
| COM. EXAMPLE 1 | 79 | 0.20 |
| COM. EXAMPLE 2 | 98 | 0.62 |
| COM. EXAMPLE 3 | 80 | 0.27 |
| COM. EXAMPLE 4 | 80 | 0.30 |
| COM. EXAMPLE 5 | 98 | 1.00 |
| COM. EXAMPLE 6 | 79 | 0.21 |
| COM. EXAMPLE 7 | 98 | 1.20 |
| COM. EXAMPLE 8 | 80 | 0.27 |
| COM. EXAMPLE 9 | 81 | 1.00 |

*Air permeability was measured under a 1.27 cm H$_2$O pressure difference.

EXAMPLE 1 and COMPARATIVE EXAMPLE 1

In Example 1 the denier of the monofilament of the warp is high and the denier of the monofilament of the weft is low.

In Comparative Example 1, the deniers of both the monofilaments of the warp and the weft are low. However, the air permeability of the woven fabrics is similar in both Examples. This can be understood in view of the fact that the low denier of monofilaments of the weft made it possible to weave good compact fabric.

EXAMPLE 2 and COMPARATIVE EXAMPLE 4

The air permeabilities of both airbags were the same because the number of monofilaments per unit area of both bags is almost same. The efficiency of the airbag of Example 2 was superior to the airbag of the Comparative Example 4.

EXAMPLE 3 and COMPARATIVE EXAMPLE 5

Even though the denier of the monofilaments of the weft in Example 3 is lower than that in Comparative Example 5, the denier of the monofilaments of the warp is equal. The efficiency of weaving is excellent at 98% in both case. Comparing the air permeabilities of the woven fabrics in both cases, it is apparent that the bag of Comparative Example 5, which the denier of the monofilaments of the weft was too high, results in an unacceptable permeability (compactness) of the airbag fabric.

In Examples 4~5 and Comparative Examples 6~9, the types of polymers are changed. In Examples 4~5, which are relevant to the scope of present invention, the efficiency of weaving and air permeability of the fabric were excellent. But in Comparative Examples 6~9, which are not relevant to the scope present invention, the efficiency of weaving and air permeability of the fabric deteriorated.

The disclosures of Republic of Korea Application Nos. 63365/96 filed Dec. 10, 1996 and 48218/97 filed Sep. 23, 1997 are hereby incorporated by reference.

Obviously, numerous modifications and variations of the present invention are possible in light of the above teachings. It is, therefore, to be understood that within the scope of the appended claims, the invention may be practiced otherwise than as specifically described herein.

What is claimed as new and is desired to be secured by Letters Patent of the United States is:

1. An uncoated fabric for producing airbags, said fabric woven of synthetic monofilaments and having a monofilament denier in the weft which is less than that of the warp,
   wherein the denier of the monofilaments of the warp ranges from 6 denier to 12 denier, and
   wherein the denier of the monofilaments of the weft ranges from 1.5 denier to below 6.0 denier.

2. The uncoated fabric according to claim 1, wherein the difference between the denier of the monofilaments of the warp and the denier of the monofilaments of the weft is more than 2.0 denier.

3. The uncoated fabric according to claim 1, wherein the total denier of the warp and the weft ranges from 210 denier to 840 denier.

4. The uncoated fabric according to claim 1, wherein said monofilaments comprise a synthetic thermoplastic resin, and the synthetic thermoplastic resin of said monofilaments in the warp and weft is a member selected from the group consisting of polyamide 66, polyamide 6, polyamide 46 and polyester.

5. The uncoated fabric according to claim 1, wherein said fabric is woven in a plain weave, a basket weave or a twill weave.

6. The uncoated fabric according to claim 1, wherein said fabric has an air permeability which, measured under 1.27 cm $H_2O$ difference in pressure, is less than 0.5 cc/(cm$^2$.sec).

7. The uncoated fabric according to claim 1, wherein said fabric is woven with an unsized warp and weft.

* * * * *